United States Patent [19]

Inao et al.

[11] Patent Number: 4,586,880

[45] Date of Patent: May 6, 1986

[54] SUBMERSIBLE MOTOR AND PUMP ASSEMBLY

[75] Inventors: Hiroshi Inao; Mitsuhiro Nishida, both of Fukuoka, Japan

[73] Assignee: Mitsubishi Denki Kabushiki Kaisha, Tokyo, Japan

[21] Appl. No.: 605,543

[22] Filed: Apr. 30, 1984

[30] Foreign Application Priority Data

| Apr. 29, 1983 | [JP] | Japan | 58-76726 |
| Apr. 29, 1983 | [JP] | Japan | 58-76727 |
| Apr. 29, 1983 | [JP] | Japan | 58-76728 |
| May 17, 1983 | [JP] | Japan | 58-74752 |
| Jul. 11, 1983 | [JP] | Japan | 58-108420 |
| Jul. 11, 1983 | [JP] | Japan | 58-108419 |

[51] Int. Cl.$^4$ ............................................. F04B 17/00
[52] U.S. Cl. ........................... 417/424; 415/121 G; 415/501
[58] Field of Search .................. 417/414, 422, 424; 415/121 G, 501; 166/105.1, 105.3, 105.4

[56] References Cited

U.S. PATENT DOCUMENTS

| 2,667,127 | 1/1954 | Rimann | 417/414 |
| 3,033,125 | 5/1962 | Pleuger | 415/501 |
| 3,104,918 | 9/1963 | Horan, Jr. et al. | 415/501 |
| 3,612,716 | 10/1971 | Deters | 415/501 |

FOREIGN PATENT DOCUMENTS

52-76704  6/1977  Japan ................................ 415/501

*Primary Examiner*—Carlton R. Croyle
*Assistant Examiner*—Donald E. Stout
*Attorney, Agent, or Firm*—Sughrue, Mion, Zinn, Macpeak, and Seas

[57] ABSTRACT

A motor of the submersible type drives a pump immersible in liquids. The motor is provided with guide grooves formed on the motor bracket for guiding undesirable small particles falling by gravity onto the bracket away from the area near the motor shaft so that before an overabundance of undesirable small particles accumulates on a collar mounted on the motor shaft, the accumulated particles gravity fall into the guide grooves. By this arrangement the undersirable wear of the motor shaft and oil seals located between the motor shaft and the motor bracket is eliminated.

11 Claims, 26 Drawing Figures

SUBMERSIBLE MOTOR AND PUMP ASSEMBLY

BACKGROUND OF THE INVENTION

This invention relates to a submersible motor for driving an underground water pump and, in particular, to an assembly of these two units. A conventional motor driven device as shown in FIGS. 1 to 4 has a circular recess 700 along the lower side of a pump 200 between an end cover 180 mounted on the upper side of a motor 100 and a lower flange 211. The end cover 180 is provided to prevent undesirable particles, such as sand, from entering the area 170 of oil seals 171 and 172.

The end cover prevents comparatively large or heavy particles from entering the oil seal area 170 and consequently prevents wear on the oil seals 171, 172 and motor shaft 160, due to the entry of such large particles into the gaps between the oil seals 171, 172 and the motor shaft 160 while the motor 100 is operating.

During the operation of the motor pump, comparatively small or light weight particles are continually sucked in along with liquid, and flow out again from the area of the suction frame 210 of the pump towards the vanes thereof. It is unlikely that such undesirable small particles enter the oil seal area 170 through the gap 181 between the end cover 180 and the motor shaft 160 when the pump 200 is operating.

After being submerged, the motor and pump have periods of continuous operation as well as periods of inactivity, when pumping is not required. During these periods of inactivity of the motor pump, the small particles, which were sucked in and float in the liquid during operation, fall, by gravity, into and accumulate within the space or recess 700. Some of these undesirable small particles then fall into the oil seal area 170 through the gap 181 between the end cover 180 and the motor shaft 160, and from there, proceed to enter a small gap between the oil seals 171, 172 and the motor shaft 160.

Figures 1, 2, 3, 4, 5, 6, 7:
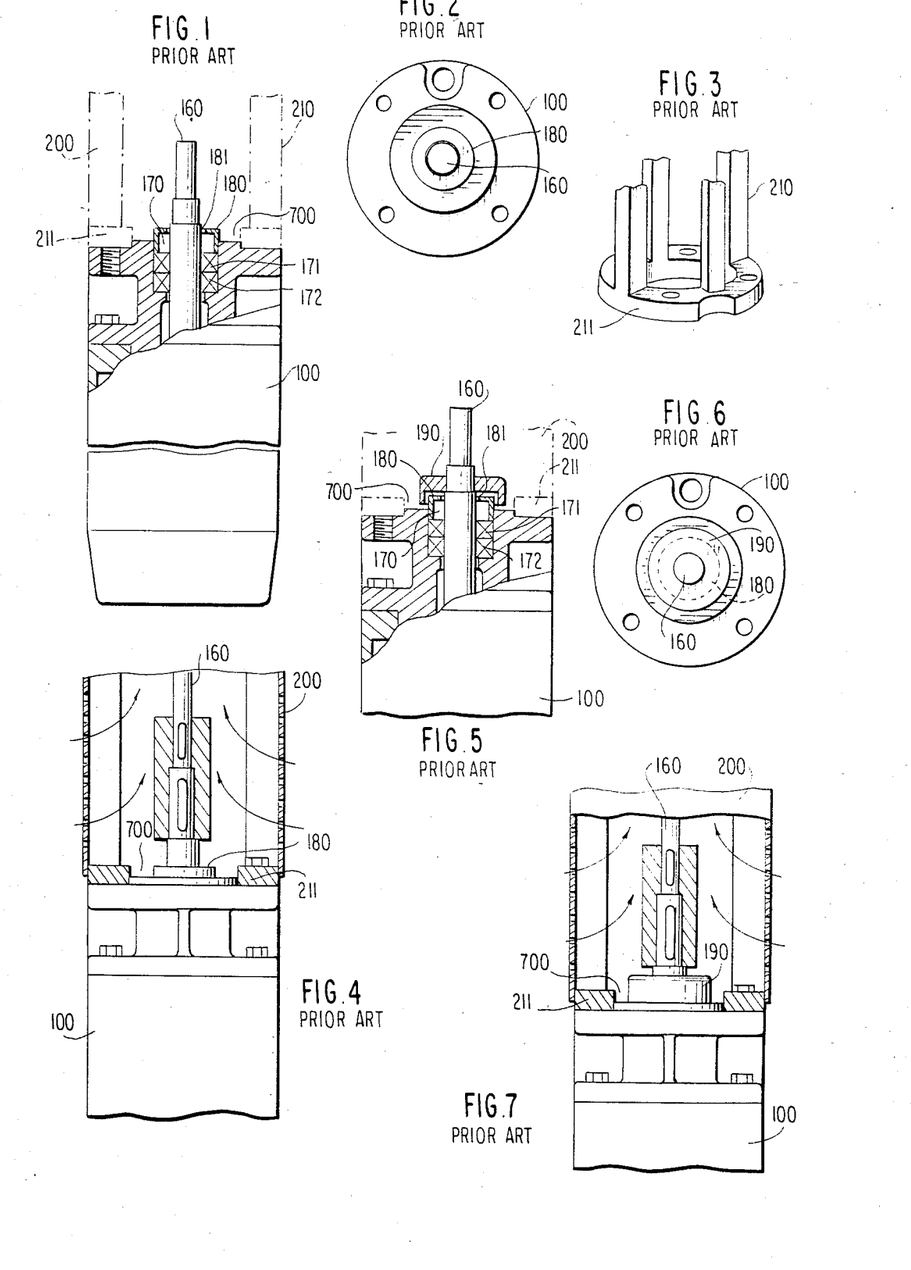
FIG. 1 shows a side view, partially in section, of one form a prior art motor for a submersible, motor driven pump.
FIG. 2 is a plan view of the motor of FIG. 1.
FIG. 3 is a perspective view of a portion of the suction frame of the prior art pump.
FIG. 4 is a side view, partially in section, of a portion of a pump with the motor of FIG. 1.
FIG. 5 shows a side view, partially in section, of another form of prior art motor for a submersible, motor driven pump.
FIG. 6 is a plan view of the motor of FIG. 5.
FIG. 7 is a side view, partially in section, of a pump connected to the motor of FIG. 5.

This tendency is particularly prevealent in the case of industrial pump motors, that is, motors used in pumping a liquid containing a comparatively large number of particles. With such tendency, it is preferable to employ a disc-like collar attached to the motor shaft at a position over the end cover to prevent undesirable particles from falling into the oil seal area. As a result, a collared prior art motor shown in FIGS. 5 and 6 is sometimes utilized to combat this problem in industrial use.

Although the collar 190 shown in FIGS. 5 and 6 may indeed prevent undesirable small particles, such as sand, etc., from falling directly into the gap between the end cover 180 and the motor shaft 160, it can not, however, prevent another occurrence which is explained as follows. If the period of inactivity is long and a large volume of undesirable particles is contained in the intake liquid, a large percentage of the particles fall into and accumulate within the space or circular recess 700 between the collar 190 and the end cover 180 and the lower ring flange 211 of the pump 200.

These accumulated particles in the circular recess 700 are contained by and movable in the liquid. Therefore, their relative position will change. As a large volume of particles accumulates in the recess 700, they move into the gap between the collar 190 and the end cover 180, and on into the area 170 of the oil seals 171, 172 through the gap between the end cover 180 and the motor shaft 160. During long periods of inactivity, the weight of the large volume of accumulated particles in the circular groove 700 itself causes the particles to shift in between the oil seals 171, 172 and the motor shaft 160, causing undesirable wear.

More specifically, when the motor begins to operate the liquid bearing the particles accumulated within the circular recess 700 and the gap between the collar 190 and the end cover 180 moves freely within these areas. This free motion enables the particles and liquid within the circular groove 700 and the gap between the collar 190 and the end cover 180 to move into the area of the oil seals 171, 172, as well as causing the undesirable wear of the oil seals 171, 172 and the motor shaft 160.

It is desirable, therefore, to prevent the abovementioned tendency, which has until recently gone undiscovered.

SUMMARY OF THE INVENTION

An object of this invention is to present an improved submersible motor and pump assembly.

Another object of the invention is to decrease or eliminate the wear of the motor shaft and/or sealing means between the motor shaft and the motor bracket.

These objects are accomplished by the provision of a submersible motor and pump assembly comprising a motor frame enclosing a rotor and a stator, a bracket connected to an upper end of said motor frame, a shaft of said motor extending through said bracket, sealing means between said shaft and said bracket to prevent circumferential liquid from entering into said motor frame, along said shaft and said bracket, and guide means formed on said bracket for guiding undesirable particles falling onto said bracket, away from the area of said shaft.

DESCRIPTION OF THE PREFERRED EMBODIMENTS

In the various embodiments of the invention, like components bear like numerical designations.

In FIGS. 8 to 11, an encased motor 100 and pump 200 form a submersible poump assembly for submerged operation in a liquid, such as water, etc. An upper bracket 110 of encased motor 100 has a first flange portion 111 bearing a plurality of threaded holes 111a, and a second flange portion 112. A neck portion 113 of the upper bracket 110 connects the first flange portion 111 to the second flange portion 112. The first and second flange portions 111, 112 and the neck portion 113 are formed as an integral unit. The upper bracket 110 is connected to a motor frame 120 by bolts 130 at the second flange portion 112.

A contacting portion 111b projects upwards from the first flange portion 111. A motor stator 140 is fixed to the motor frame 120. A motor rotor 150 is supported by the upper bracket 110, through which bracket 110, a motor shaft 160 passes. The motor rotor 150 and the motor stator 140 are enclosed within the motor frame 120. The motor shaft 160 passes rotatably through the upper bracket 110 and the end of shaft 160 extends upwards from the bracket 110.

Oil seals 171, 172 are mounted within upper bracket 110 and are between the motor shaft 160 and a portion of the upper bracket 110, through which seals the motor shaft passes. Having the seals 171, 172 mounted in this position prevents any liquid around the motor 110 and the pump 200 from entering the motor frame 120 along the circumferential surface of the motor shaft 160, and prevents liquid lubricant in the motor 100 from flowing out of the motor 100 along the circumferntial surface of the motor shaft 160 as well.

A tubular end cover 180 is provided to fix the oil seals 171, 172 in predetermined position, and to prevent undesirable particles floating in the liquid from falling into oil seal area 170. The end cover 180 has a sliding fit and is tightly fixed to upper bracket 110. A large diameter circular recess 111c is formed at the center of the upper bracket 111. A small gap 181 is formed between the motor shaft 160 and a hole within the center of the end cover 180 to permit rotation of the motor shaft, which projects through that hole. A power cable 300 extends through both of the first and second flanges 111, 112 and provides a power supply to the motor 100.

A suction frame 210 of the pump 200 is connected to the first flange 111 of the motor 100 by means of a plurality of bolts 400, of which two are shown. The suction frame 210 includes an annular lower flange portion 211 and a plurality of upstanding circumferentially spaced legs 212 connect the lower flange portion 211 to the body of the pump 200, to make them integral. A recess or cut away portion 211a, formed on the outer circumferential surface of the lower flange portion 211, permits the power cable 300 to pass through therein. A tubular strainer 220 extends around the suction frame 210 and covers the entirety of the suction frame 210. It filters out particles in the liquid in which the pump is immersed, while the pump is operating.

Coupling 500 connects pump shaft 213 encircled by legs 212 to the motor shaft 160 to conduct motor torque to the pump 200. Keys 610, 620 are arranged between the coupling 500 and shafts 160 and 213, respectively, and prevent the motor shaft 160 from rotating independently of the coupling 500 and the pump shaft 213. The lower flange portion 211 is ring shaped and has an inner circumferential surface which comes into contact with the outer circumferential surface of contacting portion 111b of the upper bracket 110 of motor 100. A space or recess 700 is thereby formed on the upper surface of the upper bracket 110 of the motor, located between the outer circumferential surface of the end cover 180 and the inner circumferential surface of the lower flange portion 211.

Therefore, space 700 takes the form of a circular recess open at its top and surrounding the end cover 180. Formed on or cut into the upper surface of the first flange portion 111 is a radial guide groove 111d extending straight out from near the outer circumferential surface of the end cover 180 to the outer circumferential surface or periphery 111e of the first flange portion 111. The guide groove 111d opens at its outer end at the circumferential surface 111e of the first flange portion 111. The top of the guide groove 111d is directly open to the bottom of the circular recess 700 and is covered by the annular lower flange portion 211 near its outer end.

Figures 8, 9, 10, 11, 12, 13:
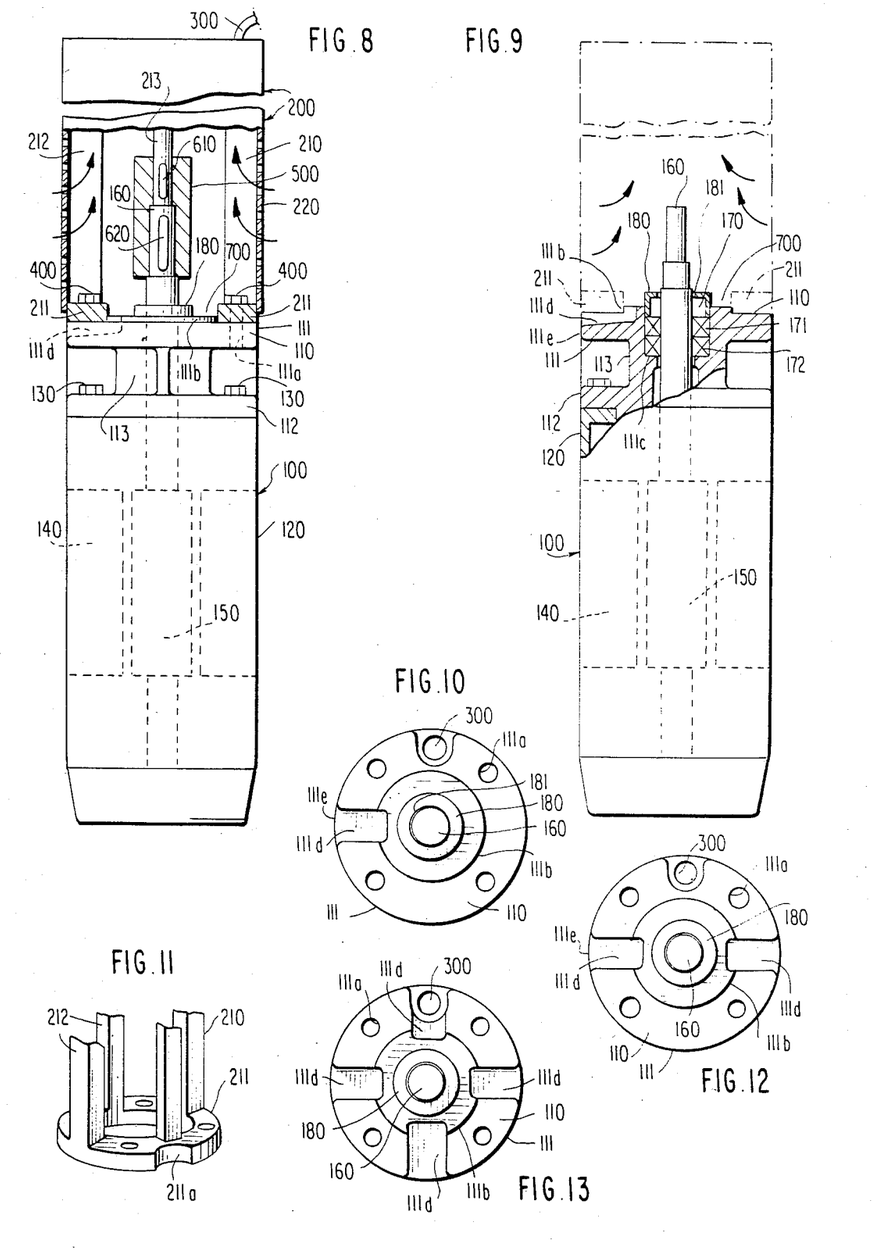
FIG. 8 is a side view of a submersible motor driven pump assembly, with the motor partially shown in section in accordance with this invention.
FIG. 9 is a side view, partially in section, of the motor driven pump assembly of FIG. 8.
FIG. 10 is a plan view of the pump motor of FIG. 9.
FIG. 11 is a perspective view of a suction frame of the pump of FIG. 8.
FIG. 12 is a plan view of a pump motor forming another embodiment of the invention.
FIG. 13 is a plan view of a pump motor forming yet another embodiment of the invention.

The bottom of the guide groove 111d is sloped so that its radially outer portion is lower than its inner portion in vertical height, as shown in FIGS. 8 and 9. The guide groove 111d defines a passage or hole passing between the lower flange portion 211 and the first flange portion 111 and opens to the circular recess 700 at its inner end when the motor 100 and the pump 200 are connected to each other. In general use when immersed in a liquid, the motor 100 is positioned at the bottom and the pump 200 is positioned on the top.

During the time while the motor 100 is energized and when the pump 200 is operating, the comparatively small or light weight, undesirable particles such as sand, are continuously sucked in with liquid by the pump 200, and flow away again with the liquid towards the suction producing components, such as the vanes, from the area within and around the suction frame 210 of the pump 200. The direction of the flow of the particles and liquid is shown by arrows in FIGS. 8 and 9.

From the arrows in the drawings and the descriptiobn above, it can be seen that there is little or no chance for the undesirable small size particles to enter the oil seal area 170 through the gap 181 between the end cover 180 and the motor shaft 160 when the pump 200 is operating. A particle whose size is such that though it is sucked upwards once but it soon falls downwards again, is inhibited from entering the gap 181 by its large size.

In other words, end cover 180 prevents comparatively large or heavy particles from entering the oil seal area 170. During the inactive period of the motor 100 and pump 200, the small particles, which were sucked and floating in liquid within the suction frame 210 when operating, tend by gravity to fall downwards and accumulate on the upper surfaces of the end cover 180, the first flange portion 211, and the bottom of the guide groove 111d. Small particles which have accumulated on the upper surface of the first flange portion 111 slide down into the guide groove 111d by gravity, and as a result, overabundance of small particles is prevented from accumulating on the upper surface of the first flange portion 111.

This arrangement also prevents a large volume of small particles from building up within the circular recess 700 thus eliminating any occurrance of some particles within the circular recess 700 sliding down into the oil seal area 170 through the gap corresponding to gap 187 of the prior art units. It is apparent from the above explanation and FIGS. 8 to 13 that the volume of small particles which are able to slide down into the oil seal area 170 in the device shown in FIGS. 8 and 13 is less than that of the prior art device shown in FIGS. 1 to 4. To prevent an overabundance of small particles from accumulating within the circular recess 700, it is preferable that the bottom of the guide groove 111d is formed with a slope so that small particles may, by gravity, naturally slide down towards the outer circumferential edge when they accumulate to an excessive extend.

When the motor 100 is energized and pump 200 begins to operate, the small particles which have accumulated on the end cover 180 and the first flange portion 111 slide down into the guide groove 111d due to a spiral flow of liquid which is created by the rotation of the liquid surrounding the motor shaft 160. The small particles accumulated within the guide groove 111d also slide down towards the outer circumferential edge of flange portion 111 due to this spiral flow of liquid.

Other embodiments having different guide grooves are shown in FIGS. 12 and 13. In FIG. 12, a pair of guide grooves 111d are formed on the upper surface of the first flange portion 111, at diametrically opposed positions, to opposite sides of the motor shaft 160.

Each of the guide grooves 111d is of the same configuration and the same function as that in FIGS. 8 to 11. In FIG. 13, two pairs of guide grooves 11d are formed on the upper surface of the first flange portion 111. Each of the guide grooves 111d shown in FIGS. 8 to 11 is of the same configuration, the same size, and the same function, except the one through which the power cable 300 passes. The guide groove 111d through which the power cable 300 passes has the same function as those in FIGS. 8 to 11.

Its configuration and size, however, is slightly different from that of those in FIGS. 8 to 11 because of the existence of the power cable 300 therein. The guide grooves 111d are equidistantly spaced, at 90 degrees, along the circumference.

Figures 14, 15, 16, 17, 18, 19, 20:
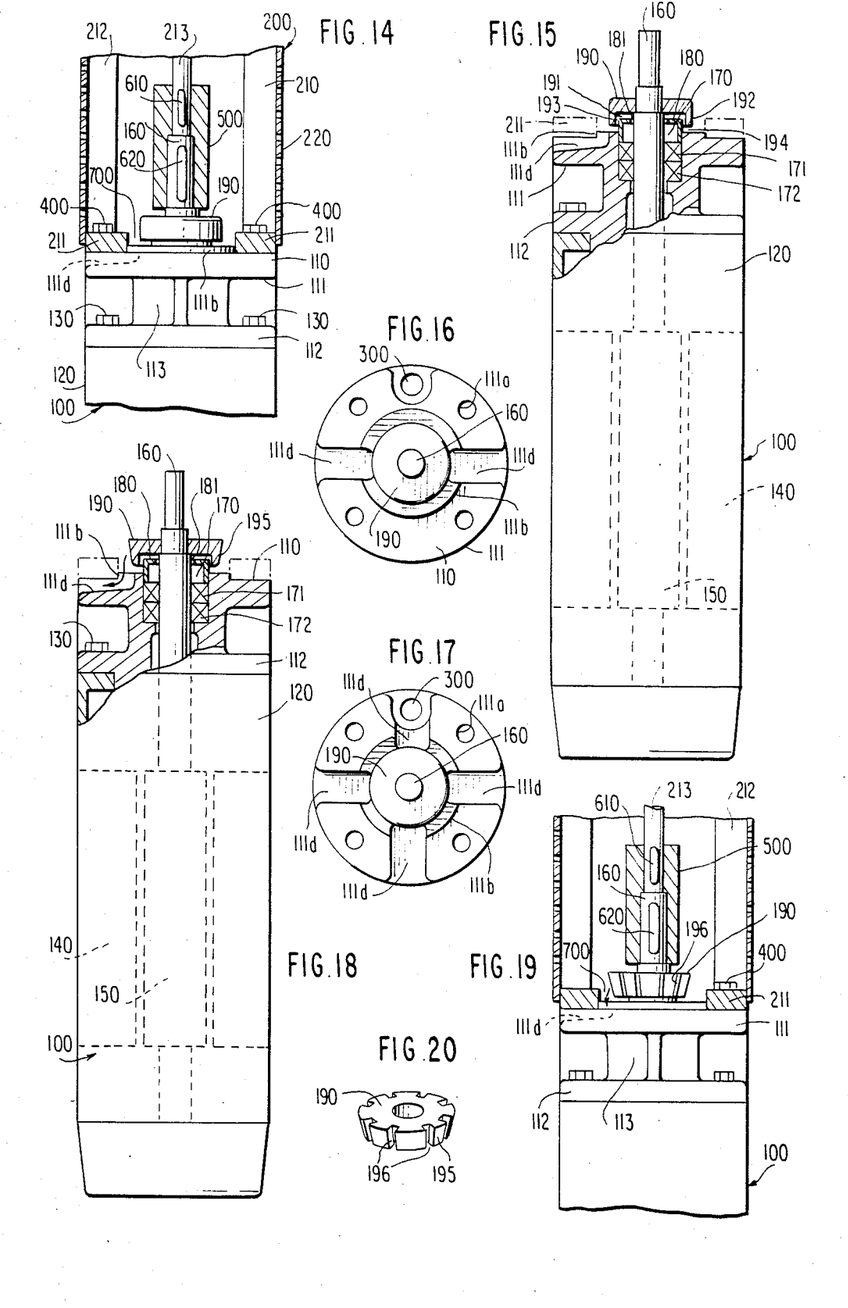
FIG. 14 is a side view of a pump motor provided with a collar and connected to a pump which is partially shown in section, forming a further embodient of the invention.
FIG. 15 is a side view, partially in section of the pump motor of FIG. 14.
FIG. 16 is a plan view of a pump motor forming a further embodiment of the invention.
FIG. 17 is a plan view of a pump motor forming a further embodiment of the invention.
FIG. 18 is a side view, partially in section, of a pump motor forming another embodiment of the invention.
FIG. 19 is a side view of a submersible pump in accordance with FIG. 18 with the pump partially in section.
FIG. 20 is a perspective view of the collar employed in the embodiment of FIG. 18 and FIG. 19.

Another embodiment is shown in FIGS. 14 and 15, in which a disc-like collar 190 is fixed to the motor shaft 160. The collar 190 is disposed over the end cover 180 and spaced therefrom to define an axial gap 191 between the upper surface of the end cover 180 and the lower surface of the collar 190. A circular skirt portion 192 projects downwards from the outer circumferential portion of the collar 190. There exists a radial gap 193 between the inner circumferential surface of the skirt portion 192 and the outer circumferential surface of the end cover 180. A further gap 194 is formed between the lower end of the skirt portion 192 and the upper surface of the first flange portion 111.

The gaps 191, 193, and 194 are so arranged that the collar 190 is free to rotate with the motor shaft 160. As mentioned above, during the non-operating periods of the motor 100 and pump 200, the small undesirable particles fall downwards and begin to accumulate on the upper surface of the first flange portion 111 as well as on the bottom of the guide groove 111d. These small particles also begin to accumulate on the upper surface of the collar 190. Particles which have accumulated on the collar 190 slide down directly onto the upper surface of the first flange portion 111 and fall to the bottom of the guide groove 111d. Some of the particles slide down onto the first flange portion 111 from collar 190 and some of them fall directly onto the first flange portion 111, but both subsequently slide down into the guide groove 111d.

This construction therefore prevents a large volume of small particles from piling up and being stored within the circular recess 700. As a result, it is rare that the particles in the circular recess 700 move into the gaps 193 and 191 or further reach the oil seal area 170, through the gap 181 between the end cover 180 and the motor shaft 160, due to the weight itself of the accumulated particles within the circular recess 700, when the motor 100 is inactive. The use of this arrangement also decreases the undesirable wear of the oil seals 171, 172, and of the motor shaft 160. On the other hand, the collar 190 completely prevents undesirable small particles from falling directly down into the oil seal area 170 through the gap 181.

When the motor 100 is again energized, after a period of rest, a few of the lighter weight particles within the gaps 191 and 193 may enter the oil seal area 170 as the liquid bearing particles within the gaps 191 and 193 is distrubed by the rotation of the motor shaft 160 and the collar 190. It is apparent that the embodiment shown in FIGS. 14 and 15 does more to decrease the undesirable wear of the oil seals 171, 172 and the motor shaft 160 than the prior art device shown in FIGS. 5 to 7.

The number of guide grooves 111d in embodiments of FIGS. 16 and 17 differs from that of the embodiment of FIGS. 14 and 15. Other components of the embodiments shown in FIGS. 16 and 17 are the same as those of the embodiment in FIGS. 14 and 15. More specifically a pair of diametrically opposed guide grooves 111d are shown in FIG. 16, and two pairs of such guide grooves are shown in FIG. 17. The guide grooves 111d in FIG. 16 are of the same configuration and perform the same function as those in FIG. 14. The guide grooves 111d in FIG. 17 are of the same configuration and perform the same function as that in FIG. 15. Another embodiment, shown in FIG. 18, differs in its configuration of collar 190 from that of the corresponding collar in FIGS. 14 and 15, having a collar with a downwardly converging or tapered peripheral surface 195.

The tapered peripheral surface 195 is at a predetermined angle so that the spiral liquid flow which occurs when the device is operating pushes away the undesirable particles within the guide groove 111d towards the outside thereof.

Another embodiment shown in FIG. 19 differs in its configuration of collar 190 from that in FIG. 18. The collar 190 has a tapered periphery 195 with a plurality of axially extending slots 196 therein.

The axially extending slots 196 cause a strong pushing force on the spiral liquid flow, driving the undesirable particles into the guide groove 111d. The configuration of the collar 190 having slots 196 is much like a bevel gear, as shown in FIG. 20.

Figures 21, 22, 23, 24, 25, 26:
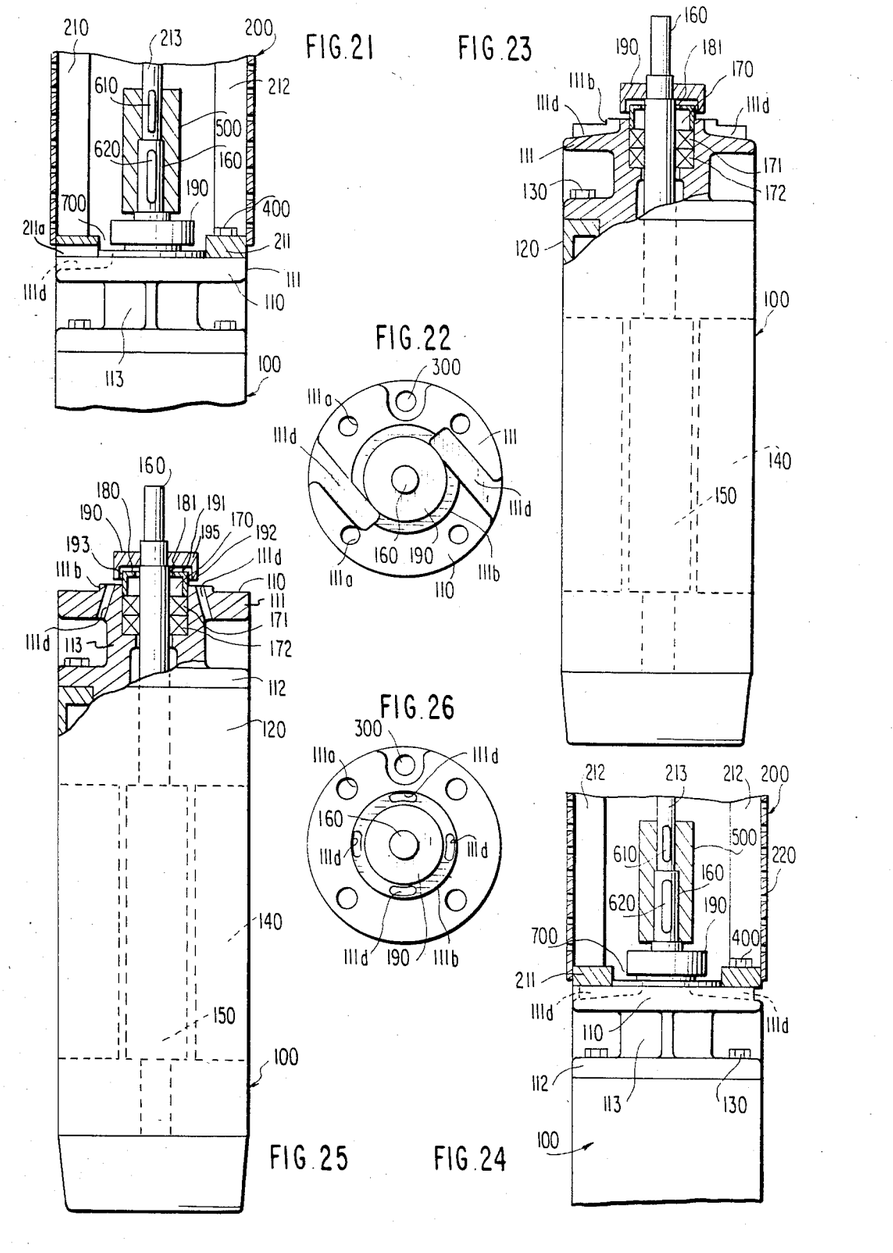
FIG. 21 is a side view of a submersible motor and pump assembly, in which guide grooves are formed on the motor and pump components, in accordance with another teaching of the invention.
FIG. 22 is a plan view of a motor with guide grooves of different configuration in accordance with another teaching of the invention.
FIG. 23 is a side view, partially in section of the motor component of FIG. 22.
FIG. 24 is a side view of the motor of FIG. 23, with a pump, which is partially in section.
FIGS. 25 and 26 are, respectively, a side view, partially in section, and a plan view of a motor provided with guide apertures in acordance with another teaching of the invention.

Another embodiment shown in FIG. 21 differs in its configuration of the lower frame portion 211 of the pump 200 from that in FIG. 4. The lower frame portion 211 has another guide groove 211a which passes radially through a lower portion of the lower frame portion 211, under the strainer 220, being open on its lower side. Guide groove 211a faces the guide groove 111d of the motor 100 and is aligned therewith.

The second guide groove 211a assists guide groove 111d by accepting a larger volume of undesirable particles, and also forms an improved passage for the spiral liquid flow which gradually removes particles that have accumulated to the extent of filling the guide groove 111d. The second guide groove 211a may be employed instead of the guide groove 111d. The second guide groove 211a, when used alone, operates in nearly the same way as the guide groove 111d alone.

Another embodiment is shown in FIGS. 22 to 24 and differs in its configuration of the guide grooves 111d as seen in the plan view, from those in FIGS. 12 and 16. Other components in FIGS. 22 to 24 are the same as those in FIGS. 12 and 16.

Collar 190 is the same as that in FIG. 15. Other than the number and configuration of the guide grooves 111d, the components are the same as those in FIGS. 8, 9, 13, 14, 15, 17, 18, and 19. Each of the grooves 111d in this are oblique rather than radial so as to follow the direction of the spiral liquid flow. In another sense, each of the grooves 111d extend parallel with a tangent at the outer periphery of contacting portion 111b of flange 111, starting at a certain point P on the outer periphery of the contacting portion 111b, as shown in FIG. 22.

Such configuration of the guide grooves 111d causes the spiral liquid flow to pass smoothly through the guide grooves 111d and causes undesirable particles accumulating within the guide grooves 111d to flow smoothly therefrom.

FIGS. 25 and 26 show another embodiment in which a plurality of inclined guide apertures 111d pass completely through the first flange portion 111 at a predetermined angle to the axis of motor shaft 160. The upper ends of the guide apertures 111d are located just below the peripheral surface 195 of a collar 190. The lower ends of the guide apertures 111d open to a space defined by a neck portion 113 and the first and second flange portions 111 and 112 are different from those in FIGS. 14 and 15, and 21 to 24.

When the undesirable small particles floating in the pumped liquid begin to fall down in the same manner as in the abovementioned embodiments, some of the particles fall down directly into the guide apertures 111d. Some other particles accumulating on the collar 190 and the upper surface of the first flange portion 111 slide down into the guide apertures 111d, and further fall into the space under the first flange portion 111.

This gravity sliding phenomenon of the accumulated particles occurs when a large volume of particles accumulates on the collar 190 and the first flange portion 111, which prevents the particles from entering the gap 191 and the seal area 170 thus eliminating or decreasing the wear of the oil seals 171, 172 and/or of the motor shaft 160. The apertures 111d may extend angularly so as to follow the direction of the spiral liquid flow originating from the rotation of the motor shaft 160. The collar 190 in FIGS. 25 and 26 may be the same as that shown in FIGS. 19 and 20.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A submersible pump assembly for pumping liquids having particles suspended therein including an underlying motor having a rotor and a stator surrounding said rotor, said rotor having a shaft extending axially therefrom and said assembly further comprising an overlying pump, said motor comprising:

a motor frame concentrically enclosing said rotor and stator;
   a bracket connected to the upper end of said motor frame;
   a hole within said bracket;
   said shaft of said motor extending through said bracket hole and engaging said pump to drive said pump;
   sealing means between said rotor shaft and said bracket for preventing liquid from entering said motor frame along said shaft;
   said pump including a suction frame, said suction frame being connected to said bracket;
   guide means disposed between said bracket and said suction frame for guiding undesirable small particles suspended in said liquid falling onto said bracket away from the area of said shaft;
   a collar fixedly mounted to said shaft over said sealing means and spaced axially therefrom;
   said guide means comprising at least one of a groove and an aperture;
   said at least one groove or aperture extending to the outer circumference of the pump assembly so as to carry undesirable particles outside the pump assembly;
   said bracket comprising a first flange portion, and a second flange portion spaced apart from said first flange portion;
   said suction frame being connected to said first flange portion and extending axially upwardly therefrom;
   whereby, said collar causes a spiral liquid flow outwardly of said collar and through said at least one groove or aperture.

2. A submersible pump assembly as set forth in claim 1, wherein said guide means comprises at least one groove within the upper face of said bracket extending radially with respect to said shaft.

3. A submersible pump assembly as set forth in claim 1, wherein said guide means comprises at least one groove extending tangentially of a portion of said bracket, so as to follow the direction of the spiral flow originating from the rotation of said shaft.

4. A submersible pump assembly as set forth in claim 1, wherein said collar has a tapered peripheral surface to direct the spiral liquid flow originating from the rotation of said shaft to said guide means.

5. A submersible pump assembly as set forth in claim 1, wherein the peripheral surface of said collar has at least one slot therein causing a spiral liquid flow during pumping to be directed towards said guide means.

6. A submersible pump assembly as set forth in claim 1, whrein said guide means comprises at least one guide groove formed on at least one of said bracket and said suction frame.

7. A submersible pump assembly for pumping liquids having particles suspended therein including an underlying motor and an overlying pump, said motor comprising a rotor and a stator surrounding said rotor, said rotor having a shaft extending axially therefrom, said assembly comprising:
 a motor frame concentrically enclosing said rotor and said stator;
 a bracket fixed to said motor frame at its upper end and having a first flange portion and a second flange portion spaced apart from said first flange portion;
 said shaft of said rotor extending through said bracket and rotatably mounted thereto;
 sealing means for sealing said shaft and said bracket to prevent liquid from entering said motor frame along said shaft;
 said pump having a suction frame, said suction frame being mounted on said first flange portion and extending axially upwardly therefrom;
 at least one guide aperture passing through said first flange portion and opening at its upper end to the upper surface of said first flange portion and opening it at its lower end to a space between said first flange portion and said second flange portion;
 a collar fixed to said shaft and located above said sealing means;
 and said guide aperture being so arranged relative to said collar that before an overabundance of gravity deposited undesirable small particles accumulates on said collar during pump cessation, said accumulated particles fall down into said guide aperture; and wherein said collar causes a spiral liquid flow radially outwardly of said collar and through said at least one guide aperture.

8. A submersible pump assembly as set forth in claim 7, wherein said guide aperture extends obliquely to the radius of said first flange portion so as to follow the direction of the spiral liquid flow originating from the rotation of said shaft.

9. A submersible pump assembly as set forth in claim 7, wherein said collar has a tapered peripheral surface to direct the spiral liquid flow originating from the rotation of said shaft to said guide aperture.

10. A submersible pump assembly as set forth in claim 7, wherein the peripheral surface of said collar has at least one slot causing the spiral liquid flow to be directed towards said guide aperture.

11. A submersible pump assembly for pumping liquids having particles suspended therein including an underlying motor with an overlying pump, said motor including a rotor, a stator surrounding said rotor, said motor having a shaft projecting axially thereof, said assembly comprising:
 a motor frame enclosing said rotor and said stator;
 a bracket having a first flange portion and a second flange portion spaced apart from said first flange portion, said first flange portion being coupled to said pump, said second flange portion being coupled to said motor;
 said shaft of said rotor extending through said bracket to drive said pump;
 sealing means for sealing said rotor shaft and said bracket to prevent liquid from entering said motor frame along said shaft;
 said pump having a suction frame, said suction frame being connected to said bracket and extending upwardly therefrom;
 a collar fixedly mounted on said shaft and located above said sealing means, said collar being disposed within said suction frame; and
 a plurality of guide grooves formed on the upper surface of said bracket, said grooves extending radially outwardly from positions near said collar to the outer periphery of said bracket, and said grooves being covered over their radial outer ends by said suction frame;
 said collar causing a spiral liquid flow outwardly of said collar and through said plurality of guide grooves.

* * * * *

UNITED STATES PATENT AND TRADEMARK OFFICE
CERTIFICATE OF CORRECTION

PATENT NO. : 4,586,880
DATED : May 6, 1986
INVENTOR(S) : Hiroshi Inao and Mitsuhiro Nishida It is certified that error appears in the above-identified patent and that said Letters Patent is hereby corrected as shown below:

Column 1, Line 20, "operation of the motor pump," should read
--operation of the motor and pump--

Column 1, Line 31, "inactivity of the motor pump," should read
--inactivity of the motor and pump--

Signed and Sealed this

Twentieth Day of January, 1987

Attest:

DONALD J. QUIGG

Attesting Officer      Commissioner of Patents and Trademarks